United States Patent
Young, Sr.

(10) Patent No.: US 6,447,040 B1
(45) Date of Patent: Sep. 10, 2002

(54) COMBINATION TAILGATE/RAMP APPARATUS FOR A PICKUP TRUCK

(76) Inventor: Christopher W. Young, Sr., 780 Forestville Rd., Munfordville, KY (US) 42765

( * ) Notice: Subject to any disclaimer, the term of this patent is extended or adjusted under 35 U.S.C. 154(b) by 0 days.

(21) Appl. No.: 10/006,271

(22) Filed: Dec. 7, 2001

(51) Int. Cl.[7] ............................................. B62D 33/03
(52) U.S. Cl. ...................................... 296/61; 414/537
(58) Field of Search .......................... 296/50, 57.1, 61; 414/537

(56) References Cited

U.S. PATENT DOCUMENTS

| | | | |
|---|---|---|---|
| 3,642,156 A | | 2/1972 | Stenson |
| D264,199 S | | 5/1982 | Wood |
| 4,795,304 A | * | 1/1989 | Dudley ........................ 414/537 |
| 4,864,673 A | * | 9/1989 | Adaway et al. ......... 414/537 X |
| 4,944,546 A | * | 7/1990 | Keller .......................... 296/61 |
| 5,156,432 A | | 10/1992 | Mccleary |
| 5,287,579 A | | 2/1994 | Estevez, Jr. |
| 5,540,474 A | | 7/1996 | Holland |
| 5,649,732 A | | 7/1997 | Jordan et al. |
| 5,907,276 A | * | 5/1999 | Lance ...................... 296/61 X |
| 5,988,725 A | * | 11/1999 | Cole ........................... 296/61 |
| 6,120,081 A | * | 9/2000 | Collins ........................ 296/61 |
| 6,250,874 B1 | * | 6/2001 | Cross .......................... 414/537 |

* cited by examiner

Primary Examiner—Joseph D. Pape

(57) ABSTRACT

A combination tailgate/ramp apparatus for a pickup truck for incorporating the tailgate of a pickup truck also into a ramp eliminating the need to have separate components. The combination tailgate/ramp apparatus for a pickup truck includes ramp members being hingedly attached to one another along longitudinal edges thereof, each of the ramp members having a plurality of holes being spacedly disposed therethrough to prevent vibration of the ramp members when being used as a tailgate; and also includes strap members being removably fastened about the ramp members when the ramp members are folded upon one another; and further includes elongate ramp support members being securely attached to one of the ramp members and also being adapted to be securely attached to the pickup truck; and also includes tailgate brackets being adapted to be securely attached to the pickup truck and also being attached to one of the ramp members for fastening the ramp members to the pickup truck with fasteners for the tailgate; and further includes bracket members being securely attached along end edges of at least two of the ramp members; and also includes elongate fastener members being extendable through the bracket members to secure the ramp members when folded upon one another.

8 Claims, 5 Drawing Sheets

COMBINATION TAILGATE/RAMP APPARATUS FOR A PICKUP TRUCK

BACKGROUND OF THE INVENTION

1. Field of the Invention

The present invention relates to combination tailgates/ramps and more particularly pertains to a new combination tailgate/ramp apparatus for a pickup truck for incorporating the tailgate of a pickup truck also into a ramp eliminating the need to have separate components.

2. Description of the Prior Art

The use of combination tailgates/ramps is known in the prior art. More specifically, combination tailgates/ramps heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,540,474; U.S. Pat. No. 5,649,732; U.S. Pat. No. 5,287,579; U.S. Pat. No. 5,156,432; U.S. Pat. No. 3,642,156; and U.S. Pat. No. Des. 264,199.

While these devices fulfill their respective, particular objectives and requirements, the aforementioned patents do not disclose a new combination tailgate/ramp apparatus for a pickup truck. The inventive device includes ramp members being hingedly attached to one another along longitudinal edges thereof, each of the ramp members having a plurality of holes being spacedly disposed therethrough to prevent vibration of the ramp members when being used as a tailgate; and also includes strap members being removably fastened about the ramp members when the ramp members are folded upon one another; and further includes elongate ramp support members being securely attached to one of the ramp members and also being adapted to be securely attached to the pickup truck; and also includes tailgate brackets being adapted to be securely attached to the pickup truck and also being attached to one of the ramp members for fastening the ramp members to the pickup truck with fasteners for the tailgate; and further includes bracket members being securely attached along end edges of at least two of the ramp members; and also includes elongate fastener members being extendable through the bracket members to secure the ramp members when folded upon one another.

In these respects, the combination tailgate/ramp apparatus for a pickup truck according to the present invention substantially departs from the conventional concepts and designs of the prior art, and in so doing provides an apparatus primarily developed for the purpose of incorporating the tailgate of a pickup truck also into a ramp eliminating the need to have separate components.

SUMMARY OF THE INVENTION

In view of the foregoing disadvantages inherent in the known types of combination tailgates/ramps now present in the prior art, the present invention provides a new combination tailgate/ramp apparatus for a pickup truck construction wherein the same can be utilized for incorporating the tailgate of a pickup truck also into a ramp eliminating the need to have separate components.

The general purpose of the present invention, which will be described subsequently in greater detail, is to provide a new combination tailgate/ramp apparatus for a pickup truck which has many of the advantages of the combination tailgates/ramps mentioned heretofore and many novel features that result in a new combination tailgate/ramp apparatus for a pickup truck which is not anticipated, rendered obvious, suggested, or even implied by any of the prior art combination tailgates/ramps, either alone or in any combination thereof.

To attain this, the present invention generally comprises ramp members being hingedly attached to one another along longitudinal edges thereof, each of the ramp members having a plurality of holes being spacedly disposed therethrough to prevent vibration of the ramp members when being used as a tailgate; and also includes strap members being removably fastened about the ramp members when the ramp members are folded upon one another; and further includes elongate ramp support members being securely attached to one of the ramp members and also being adapted to be securely attached to the pickup truck; and also includes tailgate brackets being adapted to be securely attached to the pickup truck and also being attached to one of the ramp members for fastening the ramp members to the pickup truck with fasteners for the tailgate; and further includes bracket members being securely attached along end edges of at least two of the ramp members; and also includes elongate fastener members being extendable through the bracket members to secure the ramp members when folded upon one another.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new combination tailgate/ramp apparatus for a pickup truck which has many of the advantages of the combination tailgates/ramps mentioned heretofore and many novel features that result in a new combination tailgate/ramp apparatus for a pickup truck which is not anticipated, rendered obvious, suggested, or even implied by any of the prior art combination tailgates/ramps, either alone or in any combination thereof.

It is another object of the present invention to provide a new combination tailgate/ramp apparatus for a pickup truck which may be easily and efficiently manufactured and marketed.

It is a further object of the present invention to provide a new combination tailgate/ramp apparatus for a pickup truck which is of a durable and reliable construction.

An even further object of the present invention is to provide a new combination tailgate/ramp apparatus for a pickup truck which is susceptible of a low cost of manufacture with regard to both materials and labor, and which accordingly is then susceptible of low prices of sale to the consuming public, thereby making such combination tailgate/ramp apparatus for a pickup truck economically available to the buying public.

Still yet another object of the present invention is to provide a new combination tailgate/ramp apparatus for a pickup truck which provides in the apparatuses and methods of the prior art some of the advantages thereof, while simultaneously overcoming some of the disadvantages normally associated therewith.

Still another object of the present invention is to provide a new combination tailgate/ramp apparatus for a pickup truck for incorporating the tailgate of a pickup truck also into a ramp eliminating the need to have separate components.

Yet another object of the present invention is to provide a new combination tailgate/ramp apparatus for a pickup truck which includes ramp members being hingedly attached to one another along longitudinal edges thereof, each of the ramp members having a plurality of holes being spacedly disposed therethrough to prevent vibration of the ramp members when being used as a tailgate; and also includes strap members being removably fastened about the ramp members when the ramp members are folded upon one another; and further includes elongate ramp support members being securely attached to one of the ramp members and also being adapted to be securely attached to the pickup truck; and also includes tailgate brackets being adapted to be securely attached to the pickup truck and also being attached to one of the ramp members for fastening the ramp members to the pickup truck with fasteners for the tailgate; and further includes bracket members being securely attached along end edges of at least two of the ramp members; and also includes elongate fastener members being extendable through the bracket members to secure the ramp members when folded upon one another.

Still yet another object of the present invention is to provide a new combination tailgate/ramp apparatus for a pickup truck that is easy and convenient to use.

Even still another object of the present invention is to provide a new combination tailgate/ramp apparatus for a pickup truck that saves space in the cargo bed of the pickup truck since a separate ramp doesn't need to be carried along.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
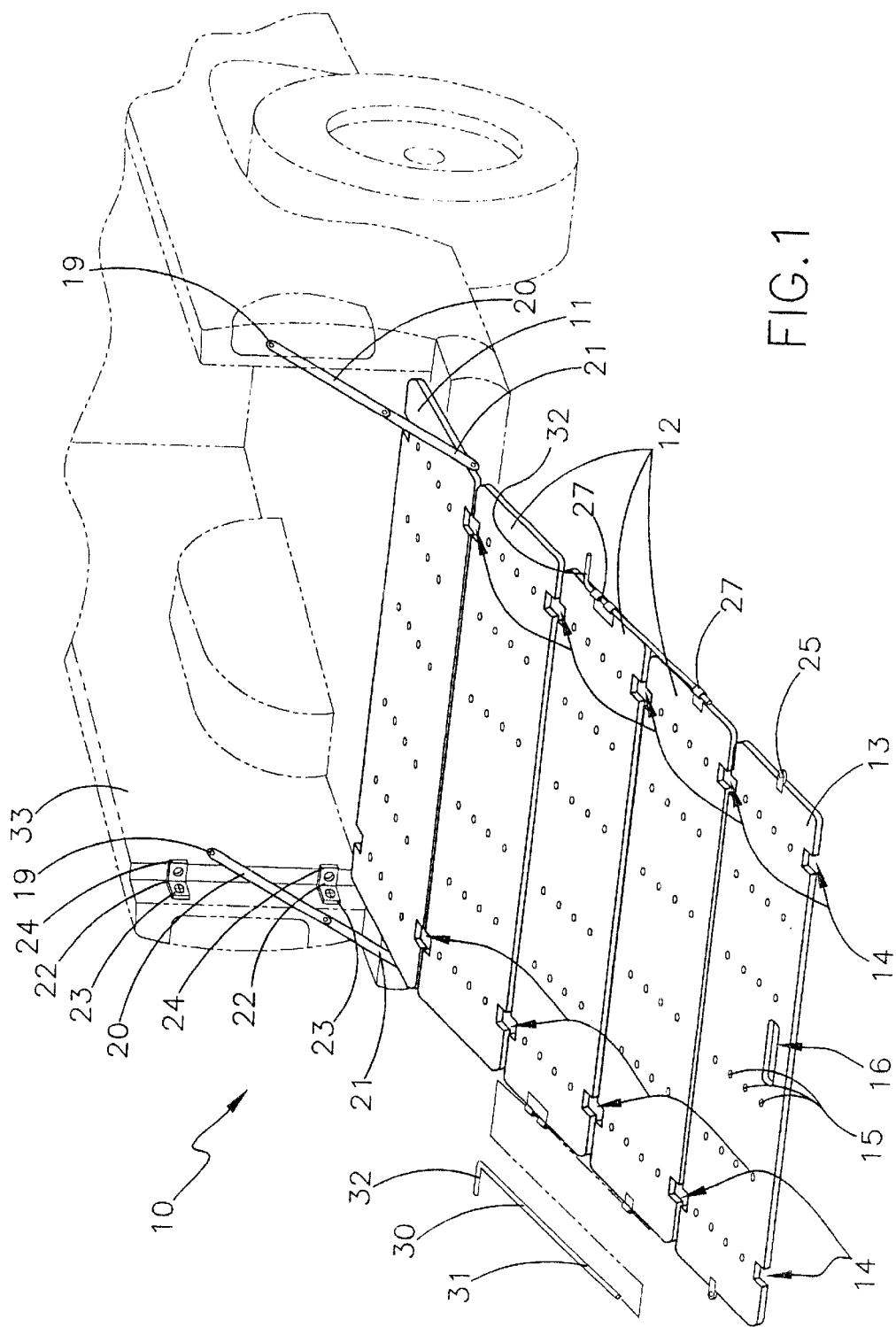
FIG. 1 is a perspective view of a new combination tailgate/ramp apparatus for a pickup truck according to the present invention and shown as a ramp.
Figure 2:
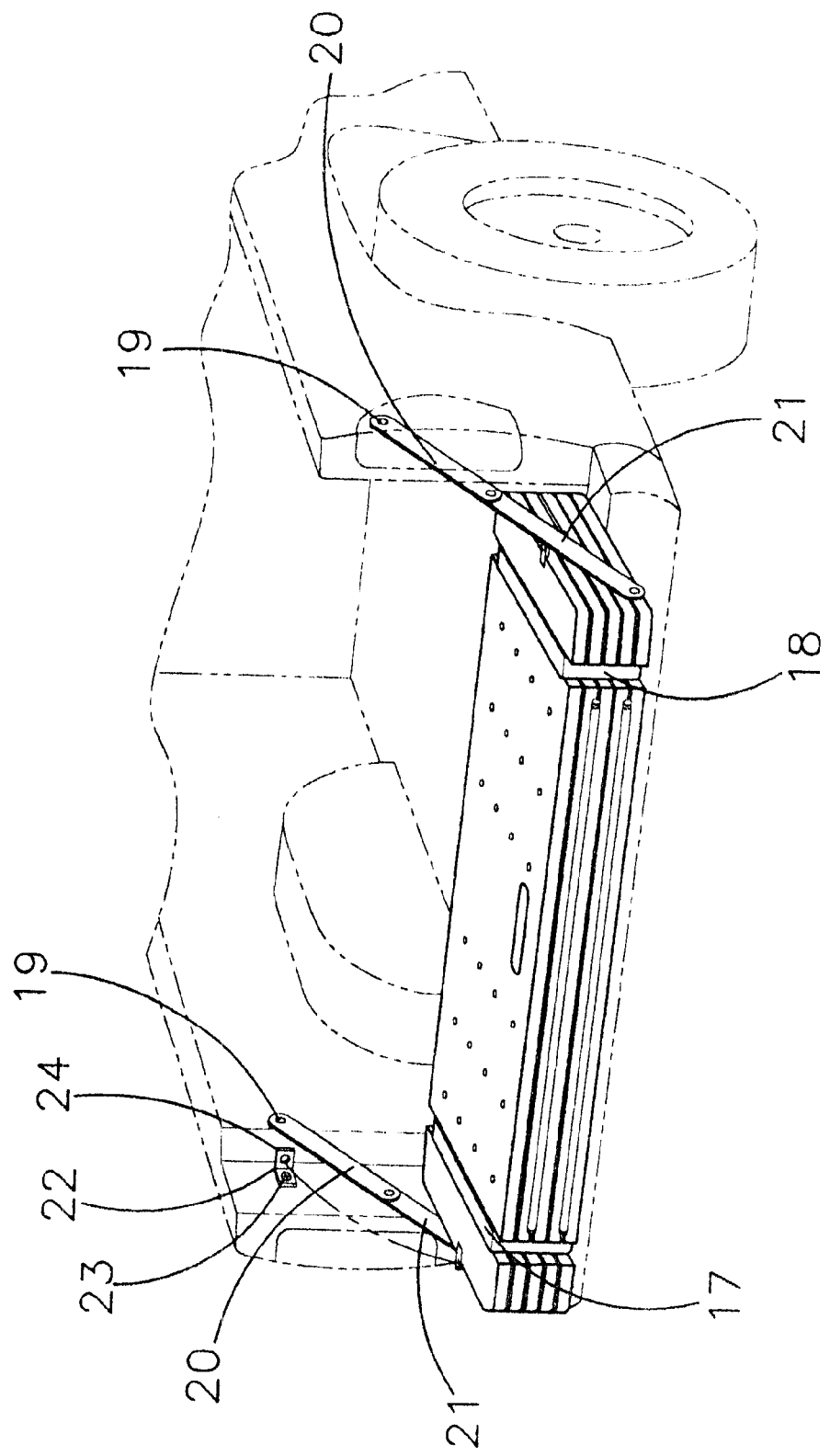
FIG. 2 is a perspective view of the present invention shown as a tailgate
Figure 3:
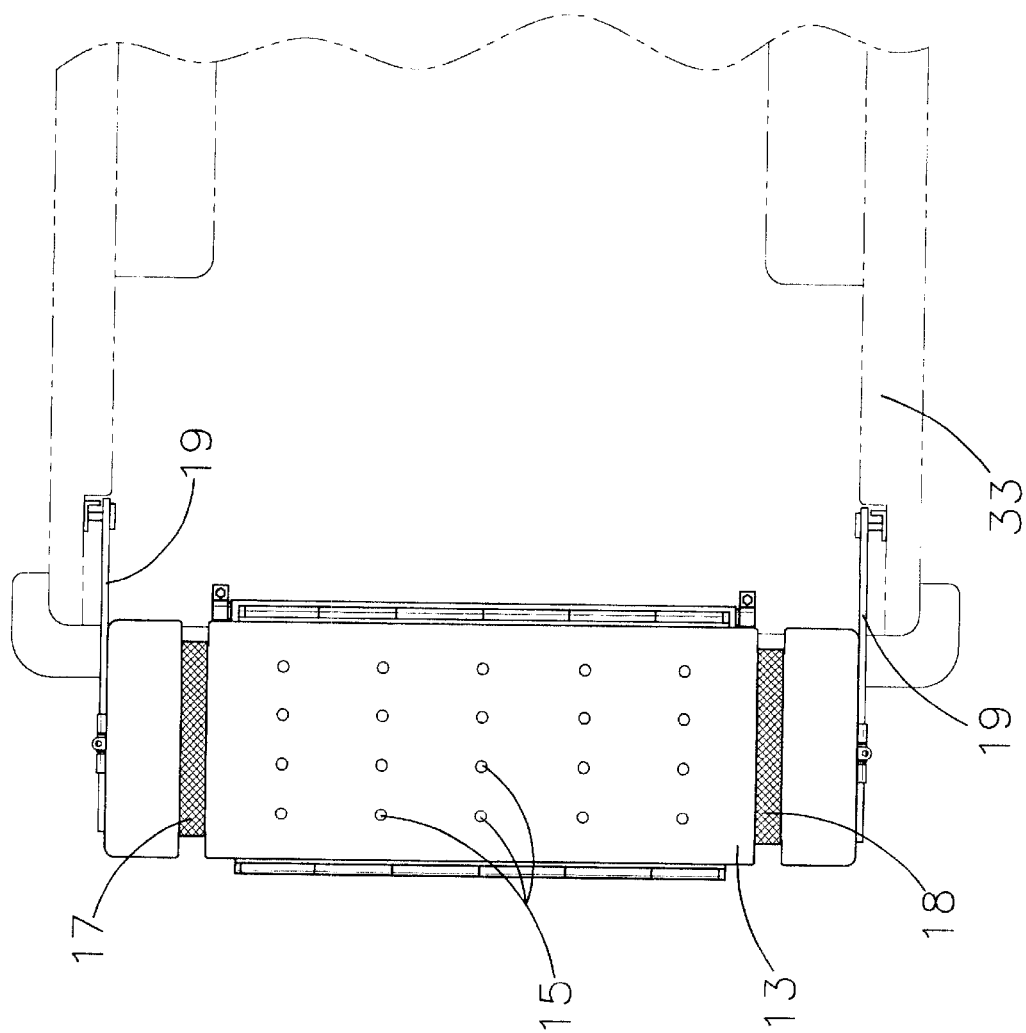
FIG. 3 is a top plan view of the present invention shown as a tailgate.
Figure 4:
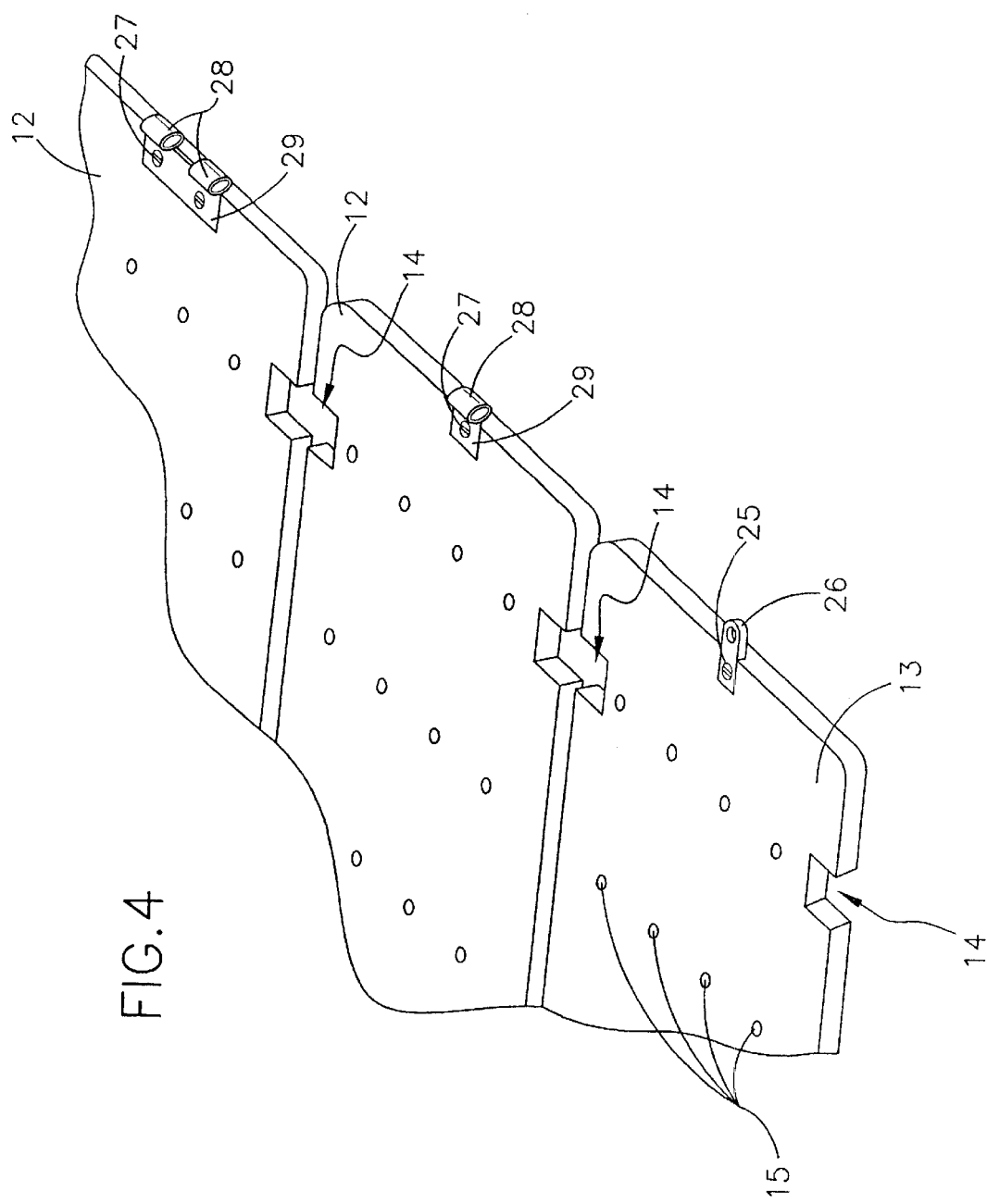
FIG. 4 is a partial perspective view of the present invention shown as a ramp.
Figure 5:
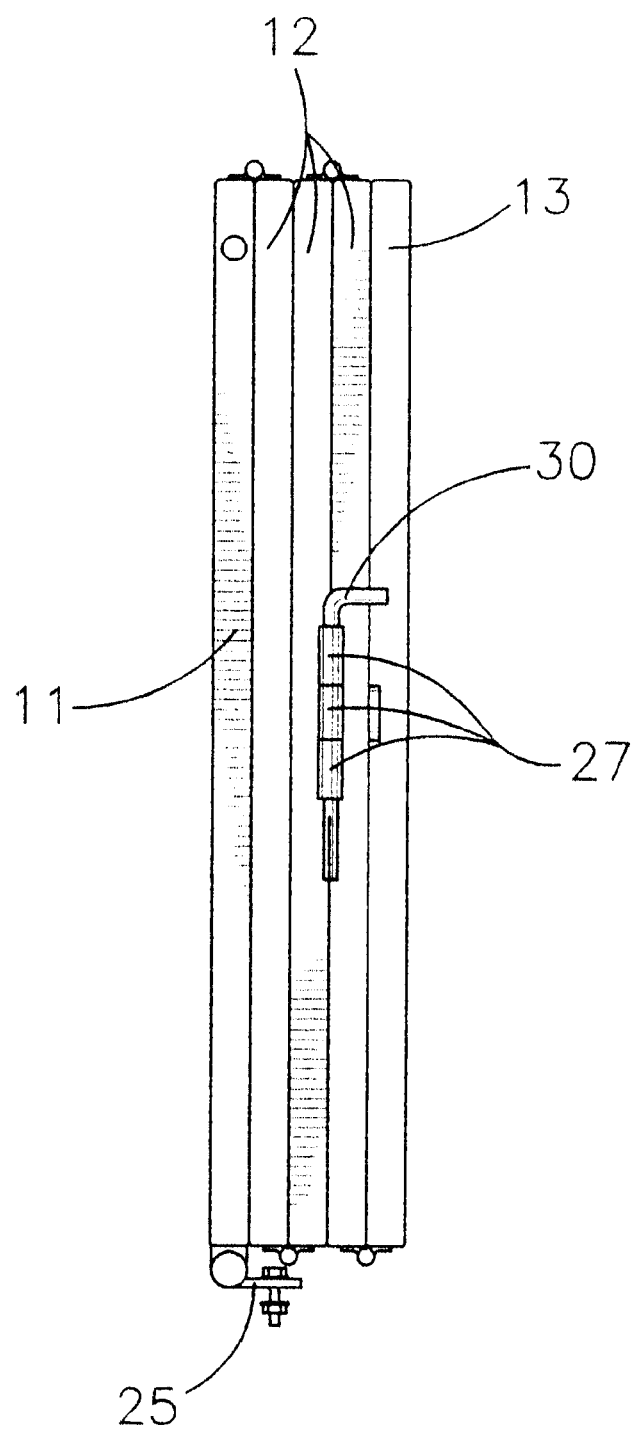
FIG. 5 is a side elevational view of the present invention shown as a tailgate.

With reference now to the drawings, and in particular to FIGS. 1 through 5 thereof, a new combination tailgate/ramp apparatus for a pickup truck embodying the principles and concepts of the present invention and generally designated by the reference numeral 10 will be described.

As best illustrated in FIGS. 1 through 5, the combination tailgate/ramp apparatus for a pickup truck 10 generally comprises ramp members 11,12,13 being hingedly attached to one another along longitudinal edges thereof. Each of the ramp members 11,12,13 has a plurality of holes 15 being spacedly disposed therethrough to prevent vibration of the ramp members 11,12,13 when being used as a tailgate. The ramp members 11,12,13 include an innermost ramp member 11 which has a first longitudinal edge being adapted to be hingedly attached to a bed of the pickup truck 33, and also include a plurality of intermediate ramp members 12 being hingedly attached to one another with one of the intermediate ramp members 12 having a first longitudinal edge being hingedly attached to a second longitudinal edge of the innermost ramp member 11, and further include an outermost ramp member 13 having a longitudinal edge which is hingedly attached to a longitudinal edge of another of the intermediate ramp members 12. Each of the ramp members 11,12,13 have slots 14 being disposed in the longitudinal edges thereof. The outermost ramp member 13 has a handhold slot 16 being disposed therethrough to allow a user to lift the outermost ramp member 13. Strap members 17,18 are removably fastened about the ramp members 11–13 when the ramp members 11–13 are folded upon one another. The strap members 17,18 are removably received in the slots 14 of the ramp members 11–13.

Elongate ramp support members 19 are securely and conventionally attached to one of the ramp members 11 and is also adapted to be securely and conventionally attached to the pickup truck 33. When attached to the pickup truck 33, the support members 19 are preferably attached to the hinge area of a conventional tailgate, though they could be attached to the walls of the pick-up 33. Each of the elongate support members 19 includes a first linkage member 20 having a first end being adapted to be pivotally attached to the pickup truck 33, and also includes a second linkage member 21 having a second end being pivotally attached to a respective end edge of the innermost ramp member 11 and also having a first end which is pivotally attached to a second end of the first linkage member 20.

Tailgate Brackets 22,25 are adapted to be securely attached to the pickup truck 33 and are also attached to one of the ramp members 13 for fastening the ramp members 11–13 as the tailgate to the pickup truck 33 with fasteners. The tailgate brackets 22,25 include first tailgate brackets 22 each having a first portion 23 and a second portion 24 which is angled relative to the first portion 23 with the first portion 23 having a hole therethrough and being adapted to be fastened to the pickup truck 33 and with the second portion 24 also having a hole therethrough, and also include second tailgate brackets 25 being conventionally attached along end edges of the outermost ramp member 13 and each of the second tailgate brackets having an eyelet 26 disposed therethrough with the second tailgate brackets 25 being fastenable to the second portions 24 of the first tailgate brackets 22 with the fasteners for the tailgate.

Bracket members 27 are securely and conventionally attached along end edges of at least two of the ramp members 11–13. The bracket members 27 are securely and conventionally attached along end edges of two of the intermediate ramp members 12. Each of the bracket members 27 has a tubular portion 28 and a flange portion 29 being conventionally attached to the tubular portion 28 and to the intermediate ramp members 12. Elongate fastener members 30 are extendable through the bracket members 27 to secure the ramp members 11–13 when folded upon one another. The elongate fastener members 30 are removably extended through the tubular portions 28 of the bracket members 27 to secure the ramp members 11–13 in the form of a ramp. Each of the elongate fastener members 30 has a shaft portion 31 and an end portion 32 which is angled relative to the shaft portion 31.

In use, the user unfastens the strap members 18,18 from about the ramp members 11–13, and then unfolds the ramp members 11–13 from being a tailgate, and extends the ramp members 11–13 in the form of a ramp, and slides the elongate fastener members 30 in the tubular portions 28 of the bracket members 27 to stabilize and strengthen the ramp members 11–13 for loading and unloading the pickup truck 33.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combination tailgate/ramp apparatus for a pickup truck comprising:

ramp members being hingedly attached to one another along longitudinal edges thereof, each of said ramp members having a plurality of holes being spacedly disposed therethrough to prevent vibration of said ramp members when being used as a tailgate;

strap members being removably fastened about said ramp members when said ramp members are folded upon one another;

elongate ramp support members being securely attached to one of said ramp members and also being adapted to be securely attached to the pickup truck;

tailgate brackets being adapted to be securely attached to the pickup truck and also being attached to one of said ramp members for fastening said ramp members as the tailgate to the pickup truck with fasteners;

bracket members being securely attached along end edges of at least two of said ramp members; and elongate fastener members being extendable through said bracket members to secure said ramp members when folded upon one another.

2. A combination tailgate/ramp apparatus for a pickup truck as described in claim 1, wherein said ramp members include an innermost ramp member which has a first longitudinal edge being adapted to be hingedly attached to a bed of the pickup truck, and also include a plurality of intermediate ramp members being hingedly attached to one another with one of said intermediate ramp members having a first longitudinal edge being hingedly attached to a second longitudinal edge of said innermost ramp member, and further include an outermost ramp member having a longitudinal edge which is hingedly attached to a longitudinal edge of another of said intermediate ramp members, each of said ramp members having slots disposed in said longitudinal edges thereof, said outermost ramp member having a handhold slot being disposed therethrough to allow a user to lift said outermost ramp member.

3. A combination tailgate/ramp apparatus for a pickup truck as described in claim 2, wherein said strap members are removably received in said slots of said ramp members.

4. A combination tailgate/ramp apparatus for a pickup truck as described in claim 2, wherein each of said elongate ramp support members includes a first linkage member having a first end being adapted to be pivotally attached to the pickup truck, and also includes a second linkage member having a second end being pivotally attached to a respective end edge of said innermost ramp member and also having a first end which is pivotally attached to a second end of said first linkage member.

5. A combination tailgate/ramp apparatus for a pickup truck as described in claim 2, wherein said tailgate brackets include first tailgate brackets each having a first portion and a second portion which is angled relative to said first portion with said first portion having a hole therethrough and being adapted to be fastened to the pickup truck and with said second portion also having a hole therethrough, and also include second tailgate brackets being attached along end edges of said outermost ramp member and each of said second tailgate brackets having a hole therethrough with said second tailgate brackets being fastenable to said second portions of said first tailgate brackets with said fasteners for the tailgate.

6. A combination tailgate/ramp apparatus for a pickup truck as described in claim 2, wherein said bracket members are securely attached along end edges of two of said intermediate ramp members, each of said bracket members having a tubular portion and a flange portion being attached to said tubular portion and to said intermediate ramp members.

7. A combination tailgate/ramp apparatus for a pickup truck as described in claim 6, wherein said elongate fastener members are removably extended through said tubular portions of said bracket members to secure said ramp members as a ramp, each of said elongate fastener members having a shaft portion and an end portion which is angled relative to said shaft portion.

8. A combination tailgate/ramp apparatus for a pickup truck comprising:

ramp members being hingedly attached to one another along longitudinal edges thereof, each of said ramp members having a plurality of holes being spacedly disposed therethrough to prevent vibration of said ramp members when being used as a tailgate, said ramp members including an innermost ramp member which has a first longitudinal edge being adapted to be hingedly attached to a bed of the pickup truck, and also including a plurality of intermediate ramp members being hingedly attached to one another with one of said intermediate ramp members having a first longitudinal edge being hingedly attached to a second longitudinal edge of said innermost ramp member, and further including an outermost ramp member having a longitudinal edge which is hingedly attached to a longitudinal edge of another of said intermediate ramp members, each of said ramp members having slots disposed in said longitudinal edges thereof, said outermost ramp member having a hand-hold slot being disposed therethrough to allow a user to lift said outermost ramp member;

strap members being removably fastened about said ramp members when said ramp members are folded upon one another, said strap members being removably received in said slots of said ramp members;

elongate ramp support members being securely attached to one of said ramp members and also being adapted to be securely attached to the pickup truck, each of said elongate ramp support members including a first linkage member having a first end being adapted to be pivotally attached to the pickup truck, and also including a second linkage member having a second end being pivotally attached to a respective end edge of said innermost ramp member and also having a first end which is pivotally attached to a second end of said first linkage member;

tailgate brackets being adapted to be securely attached to the pickup truck and also being attached to one of said ramp members for fastening said ramp members as the tailgate to the pickup truck with fasteners, said tailgate brackets including first tailgate brackets each having a first portion and a second portion which is angled relative to said first portion with said first portion having a hole therethrough and being adapted to be fastened to the pickup truck and with said second portion also having a hole therethrough, and also including second tailgate brackets being attached along end edges of said outermost ramp member and each of said second tailgate brackets having a hole therethrough with said second tailgate brackets being fastenable to said second portions of said first tailgate brackets with said fasteners for the tailgate;

bracket members being securely attached along end edges of at least two of said ramp members, said bracket members being securely attached along end edges of two of said intermediate ramp members, each of said bracket members having a tubular portion and a flange portion being attached to said tubular portion and to said intermediate ramp members; and elongate fastener members being extendable through said bracket members to secure said ramp members when folded upon one another, said elongate fastener members being removably extended through said tubular portions of said bracket members to secure said ramp members as a ramp, each of said elongate fastener members having a shaft portion and an end portion which is angled relative to said shaft portion.

\* \* \* \* \*